United States Patent
McCoy et al.

(10) Patent No.: US 7,308,362 B2
(45) Date of Patent: Dec. 11, 2007

(54) SEISMIC ANALYSIS USING ELECTRICAL SUBMERSIBLE PUMP

(75) Inventors: Robert H. McCoy, Talala, OK (US); Francis D. Doherty, Sugar Land, TX (US); James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 34 days.

(21) Appl. No.: 11/413,307

(22) Filed: Apr. 28, 2006

(65) Prior Publication Data

US 2006/0247861 A1 Nov. 2, 2006

Related U.S. Application Data

(60) Provisional application No. 60/675,961, filed on Apr. 29, 2005.

(51) Int. Cl.
*G01V 1/28* (2006.01)

(52) U.S. Cl. .............................................. 702/6; 702/14

(58) Field of Classification Search .................... 702/6, 702/9, 14, 16, 17

See application file for complete search history.

(56) References Cited

U.S. PATENT DOCUMENTS

| | | | | |
|---|---|---|---|---|
| 4,926,391 A | * | 5/1990 | Rector et al. .................. | 367/41 |
| 6,151,554 A | * | 11/2000 | Rodney .......................... | 702/9 |
| 6,785,641 B1 | * | 8/2004 | Huang ............................ | 703/7 |
| 7,219,747 B2 | * | 5/2007 | Gleitman et al. ............. | 175/40 |

* cited by examiner

*Primary Examiner*—Donald E McElheny, Jr.
(74) *Attorney, Agent, or Firm*—Bracewell & Giuliani LLP

(57) ABSTRACT

Seismic data is collected by using an electrical submersible pump assembly in a well that is producing well fluid. By sweeping the rotational speed of the pump assembly through a selected range at selected intervals, seismic waves of varying frequency are emitted. These seismic waves are then picked up with a seismic sensor located at the surface or located in another well. If the seismic sensors are located in another well, the signal from the sensor may be transmitted to the surface by superimposing the data onto the power cable leading to the pump located in that other well. The seismic survey may be repeated at regular intervals, and the results will reveal the changes that have taken place over time in the reservoir.

17 Claims, 2 Drawing Sheets

SEISMIC ANALYSIS USING ELECTRICAL SUBMERSIBLE PUMP

CROSS REFERENCE TO RELATED APPLICATION

This application claims priority to provisional application Ser. No. 60/675,961, filed Apr. 29, 2005.

FIELD OF THE INVENTION

This invention relates in general to seismic analysis of earth formations, and in particular to performing a seismic survey between two wells utilizing an electrical submersible pump as a seismic source.

DESCRIPTION OF THE RELATED ART

Seismic reservoir monitoring is a technique for tracking the movement of reservoir fluids, such as the fluids found in oil or gas producing reservoirs. Seismic reservoir monitoring involves periodically performing seismic testing at the same location. The results of the tests are then compared and the changes between successive test results can be interpreted to indicate what changes have occurred in the reservoir.

In order to better manage a reservoir, it is important to understand how fluid distribution changes over time. Having an understanding of how fluids flow in response to production and injection allows for optimization of the reservoir. For one example, seismic reservoir monitoring can identify bypassed oil.

Reservoir simulation by computer modeling is a method commonly used to predict the movement of reservoir fluids. Data collected by seismic reservoir monitoring can improve these models by comparing the computer's prediction with the results of the seismic surveys. The models can then be adjusted to more closely resemble the recorded seismic results and future predictions based on the simulation are likely to be more accurate.

The crosswell, or sometimes called interwell, seismic technique involves transmitting seismic waves between pairs of wells. With this technique, a seismic source is located in one well and detection equipment is located in another well.

Whether or not the detection equipment is located at the surface or in another well, the seismic source is traditionally an independent piece or equipment that may deliver an acoustic pulse or may vibrate to create a signal that will be detected by receivers in the second well or receivers at the surface.

The seismic reservoir monitoring process may be costly in terms of obtaining the equipment to perform the seismic survey as well as being costly in terms of the potential disruption in production while the equipment is being deployed and the survey performed. The high cost of pulling equipment from one or more wells, the requirement of bringing specialized equipment to the well site, and the lack of availability of variable frequency seismic sources for a well bore means that seismic reservoir monitoring is not currently economically feasible for many reservoirs.

Therefore, there is a need for a method of seismic reservoir monitoring that reduces these costs and allows for the surveys to be completed on a more frequent and regular basis.

SUMMARY OF THE INVENTION

Embodiments of the present invention provide a new method of seismic reservoir monitoring that makes use of a piece of equipment that is already located in the well and will not interrupt well production. In this invention a down hole electric submersible pump that is rotated by a variable speed drive acts the seismic source. By sweeping the frequency of the drive, a family of fundamentals and harmonics may be produced that can then be received and processed. Sensor modules located in another well or at the surface detect the vibrations or seismic waves.

In this manner, the seismic survey can be performed with very little interference to the operation of the well. The survey may be performed at a given interval of time and the data collected and compared to previous surveys to analyze the effects of production operations over an elapsed time.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION OF THE PREFERRED EMBODIMENTS

Figure 1:
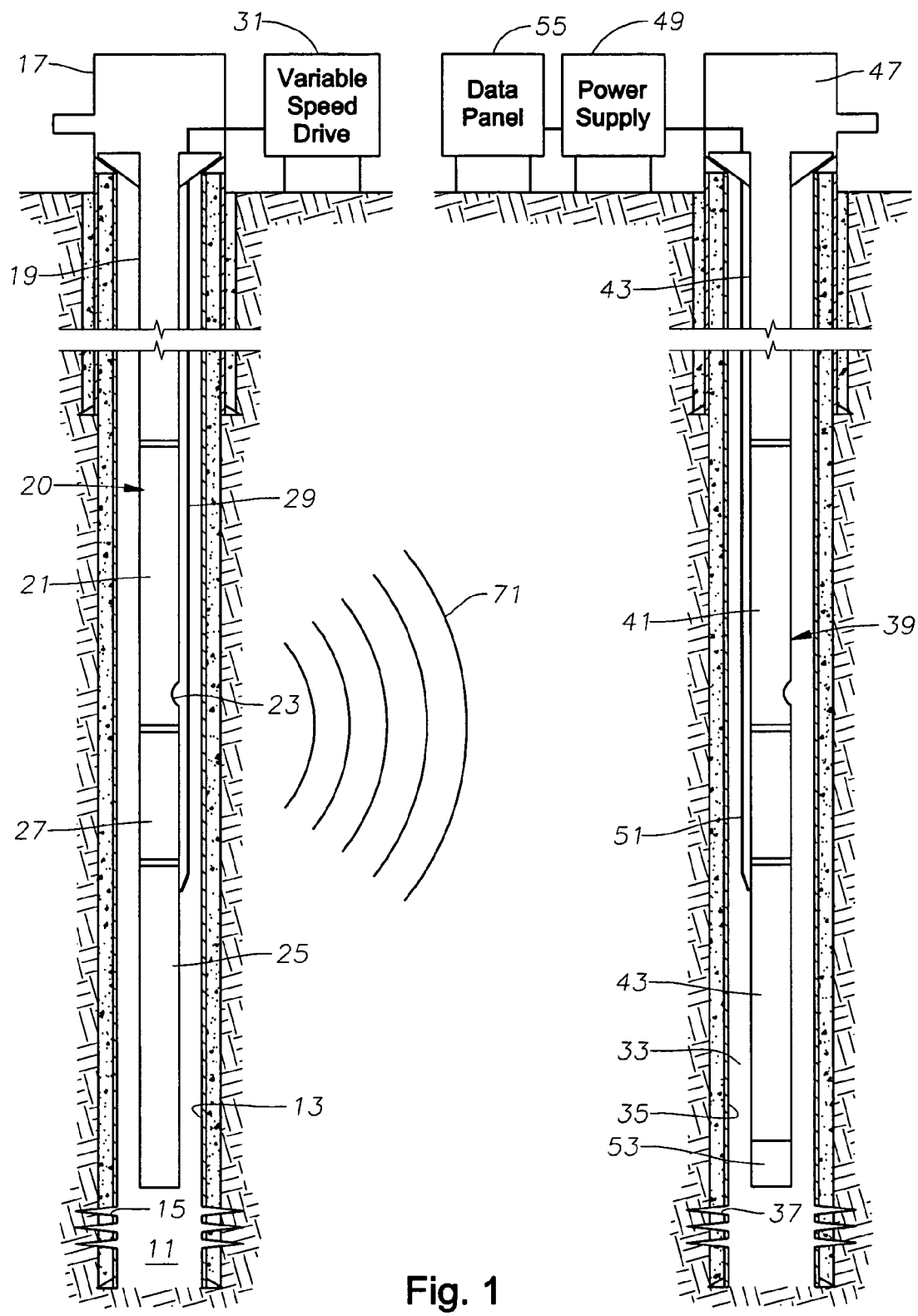
FIG. 1 is a schematic view of two adjacent wells having a seismic system for reservoir analysis

Referring to FIG. 1, well 11 is conventional, having a string of casing 13 cemented in the well. Casing 13 has perforations 15 for allowing formation fluid to flow into the well. A wellhead assembly 17 is located at the surface for controlling the well fluid flowing from the well. In this example, a string of production tubing 19 is suspended from wellhead assembly 17 and extends into the well within casing 13.

An electrical submersible pump assembly 20 is suspended on tubing 19. Electrical submersible pump assembly 20 has a rotary pump 21 that is preferably a centrifugal pump having a plurality of stages of impellers and diffusers. Pump 21 could alternately be other types of rotary pumps, such as a progressive cavity pump. A progressive cavity pump employs a helical rotor that rotates within a helical cavity of an elastomeric stator. Pump 21 has an intake 23 for receiving well fluid from perforations 15.

A down hole electrical motor 25 rotates pump 21. Motor 25 is connected to pump 21 through a seal section 27. Seal section 27 reduces pressure differential between the interior lubricant pressure in motor 25 and exterior hydrostatic pressure in well 11. A power cable 29 extends from the surface for supplying power to motor 25.

A variable speed drive 31 is located at the surface for supplying power to motor 25 through power cable 29. Motor 25 is preferably a three-phase alternating current electrical motor. Variable speed drive 31 supplies a variable frequency to motor 25 to vary the speed of motor 25. Typically, variable speed drive 31 will operate motor 25 at speeds from near zero up to about 3,600 rpm.

A second well 33 is spaced a conventional distance from first well 11. The distance depends upon the field, but is generally in the range from 2000 to 3000 feet. Second well 33 also has casing 35 and perforations 37, which will likely be in the same earth formation or reservoir as perforations 15, but do not have to be. Furthermore second well 33 does not have to be at the same depth as first well 11.

An electrical submersible pump assembly 39 is preferably located in second well 33. ESP assembly 39 includes a pump 41, which may be the same type as pump 21, and a motor 43, which may be the same type as motor 25. Electrical submersible pump assembly 39 is supported on a string of tubing 45, which in turn is suspended from a wellhead assembly 47 at the surface. A power source 49 at the surface supplies electrical power to motor 43. Power source 49 may be a variable speed drive such as variable speed drive 31, or it could be a fixed frequency source, such as public utility line power. Power source 49 supplies power via power cable 51 to motor 43.

A sensor module 53 is mounted to the lower end of electrical motor 43 in this embodiment. Sensor module 53 has at least one sensor that senses at least one parameter in well 33 and superimposes signals in response thereto onto power cable 51 or on a separate data wire. A data panel 55 at the surface detects and provides a readout and record of the parameter monitored by sensor module 53.

Figure 2:
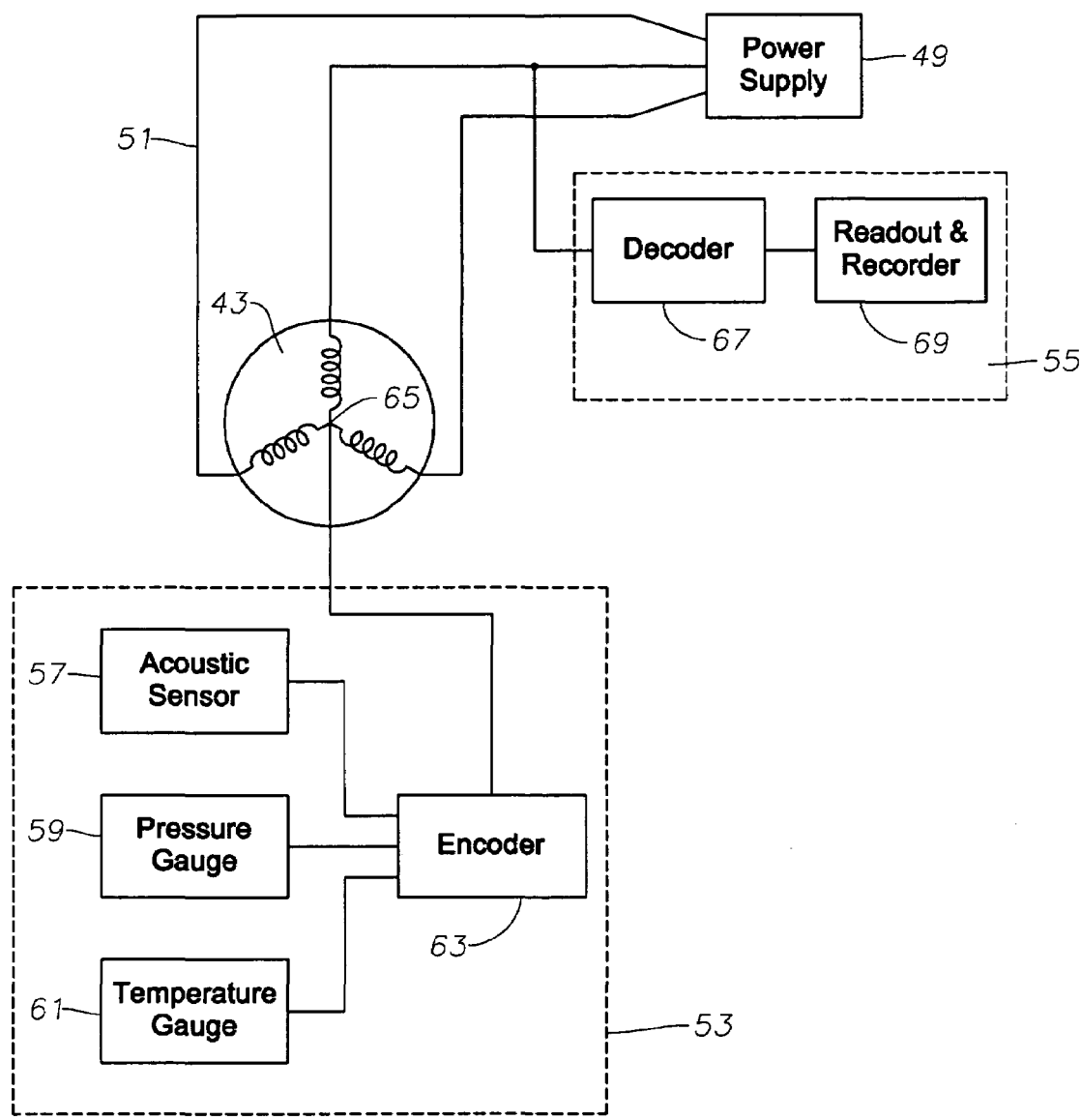
FIG. 2 is a schematic view of some of the seismic components of the second well shown in FIG. 1.

Referring to FIG. 2, sensor module 53 has a seismic sensor or geophone 57. Optionally, sensor module 53 may also have a conventional pressure gauge 59 and a temperature gauge 61, but these gauges are not necessary to this invention. Seismic sensor 57 detects vibrations or seismic waves transmitted through the earth formation from first ESP assembly 20 in first well 11. Seismic sensor 57 also detects the vibrations of second ESP assembly 39 while it is operating, which may be filtered out in order to differentiate the vibrations emanating from first ESP assembly 20.

Seismic sensor 57, pressure gauge 59 and temperature gauge 61 are connected to an encoder 63, which encodes the signals in a conventional manner for transmission over power cable 51. This may be a limited time sample, such as 10 seconds, in the frequency domain, and cross correlated with its own pump and motor noise. In this embodiment, motor 43 has its windings configured in a "Y" configuration, and sensor module 53 has a tap leading to the center node of motor 43. By known techniques, the signals are superimposed on the three-phase power being supplied over power cable 51 by power supply 49. Data panel 55 at the surface has a decoder circuit 67 that decodes the data signals superimposed on power cable 51 in a conventional manner. Decoder 67 provides the information optionally to a readout and recorder 69. If desired, a transmission unit for transmitting the information via telephone lines or satellite could be included.

In operation, variable speed drive 31 supplies power to motor 25. Motor 25 drives pump 21, causing well fluid to flow to pump intake 23 and from pump 21 to the surface via tubing 19. Similarly, power supply 49 will operate motor 43 in second well 33. Pump 41 produces well fluid to the surface via tubing 45. If pressure and temperature sensors 59 and 61 are employed, that data would be recorded by data panel 55.

Either using pump 21 and motor 25 as a broad band noise source, periodically, variable speed drive 31 is placed in a mode where it will sweep the frequency, such as from zero to 3600 rpm or some other interval. The sweep will take place over a selected time interval, such as from 10 to 60 seconds. The sweep is preferably performed automatically, but it could be done manually. This sweeping of the frequency causes motor 25 speed to change in response. The rotation of components in pump 21, seal section 27 and motor 25 creates a family of fundamental and harmonic frequencies that emanate from first well 11 as indicated by the sound waves 71 in FIG. 1. The sweep of frequencies transmits through the earth formation as seismic waves of varying frequencies. At least some of the seismic waves are picked up by seismic sensor 57 in adjacent well 33. Preferably second ESP assembly 39 continues to operate, but at a fixed speed during the seismic survey. Alternately, if noise from second ESP assembly 39 interferes too much with the receipt of the seismic waves from the sweeping of first ESP assembly 20, second ESP assembly 39 could be shut down. The signals from seismic sensor 57 are relayed over power cable 51 to data panel 55, which may process and record those signals.

The processing could be performed at the site or the data sent via a communication link to a central computer at a remote location, where it is processed, recorded and optionally displayed in real time. Seismic surveys as described may take place once per day, once per week, or any other desired interval. The signals detected by seismic sensor 57 will vary over time as the earth formation between wells 11 and 33 changes. Encroaching water or a change in gas content will create a change in the seismic signal. The history of seismic surveys allows an operator to analyze the effects on the reservoir of the production operation over an elapsed time.

In the drawings and specification, there have been disclosed typical preferred embodiments of the invention and, although specific terms are employed, they are used in a generic and descriptive sense only and not for the purposes of limitation. The invention has been described in considerable detail with specific reference to various embodiments. It will be apparent, however, that various modifications and changes can be made within the spirit and scope of the invention as described in the foregoing specification and defined in the following appended claims.

We claim:

1. A method for collecting seismic data, comprising:
   (a) installing an electrical submersible pump assembly in a well;
   (b) supplying electrical power to the pump assembly and producing well fluid;
   (c) at selected intervals, sweeping the rotational speed of the pump assembly through a selected range, thereby sending seismic waves of varying frequency into the reservoir; and
   (d) detecting the seismic waves with a seismic sensor.

2. The method according to claim 1, wherein:
   step (b) comprises supplying three-phase electrical power; and
   step (c) comprises sweeping the frequency of the three-phase power being supplied to the pump assembly.

3. The method according to claim 1, wherein steps (b), (c) and (d) occur simultaneously.

4. The method according to claim 1, wherein the seismic sensor is connected to a second electrical submersible pump assembly, and the second electrical submersible pump assembly and seismic sensor is lowered into a second well.

5. The method according to claim 4, further comprising supplying three-phase electrical power over a power cable leading to the second pump assembly and superimposing the signals from the seismic sensor onto the power cable extending to the second pump assembly.

6. A method for collecting seismic data, comprising:
   (a) installing a first electrical submersible pump assembly in a first well;
   (b) connecting a seismic sensor to a second electrical submersible pump assembly, and lowering the second electrical submersible pump assembly and seismic sensor into a second well;
   (c) supplying electrical power to the first pump assembly and producing well fluid;

(d) supplying electrical power to the second pump assembly and producing well fluid;
(e) at selected intervals, sweeping the rotational speed of the first pump assembly through a selected range, thereby sending seismic waves of varying frequency into the reservoir; and
(f) detecting the seismic waves with the seismic sensor and sending signals in response thereto to the surface of the second well.

7. The method according to claim 6, wherein:
step (c) comprises supplying three-phase electrical power; and
step (e) comprises sweeping the frequency of the three-phase power being supplied to the first pump assembly.

8. The method according to claim 6, wherein:
step (d) comprises supplying three-phase electrical power over a power cable leading to the second pump assembly; and
step (f) comprises superimposing the signals from the seismic sensor onto the power cable extending to the second pump assembly.

9. The method according to claim 6, wherein steps (d), (e) and (f) occur simultaneously.

10. The method according to claim 6, wherein step (d) further comprises operating the second pump assembly at a constant speed.

11. A method for collecting seismic data, comprising:
(a) installing a first electrical submersible pump assembly in a first well;
(b) connecting a seismic sensor to a second electrical submersible pump assembly, and lowering the second electrical submersible pump assembly and seismic sensor into a second well;
(c) supplying electrical power to the first pump assembly with a variable speed drive and producing well fluid;
(d) supplying electrical power to the second pump assembly and producing well fluid;
(e) at selected intervals, placing the variable speed drive in a mode in which it will sweep the frequency through a selected range, thereby sending seismic waves of varying frequency into the reservoir; and
(f) detecting the seismic waves with the seismic sensor and sending signals in response thereto to the surface of the second well.

12. The method according to claim 11, wherein:
step (e) comprises placing the variable speed drive in a mode in which it will sweep the frequency through a selected range automatically.

13. The method according to claim 11, wherein:
step (d) comprises supplying three-phase electrical power over a power cable leading to the second pump assembly and
step (f) comprises superimposing the signals from the seismic sensor onto the power cable extending to the second pump assembly.

14. The method according to claim 11, wherein steps (d), (e) and (f) occur simultaneously.

15. The method according to claim 11, wherein the selected range is zero to 3600 rpm.

16. The method according to claim 11, wherein the sweep will take place over a selected time interval.

17. The method according to claim 16, wherein the selected time interval is from 10 to 60 seconds.

* * * * *